United States Patent [19]

Rucker

[11] 4,084,999
[45] Apr. 18, 1978

[54] APPARATUS FOR FORMING CONTAINERS WITH FIN-TYPE SEAMS

[75] Inventor: George I. Rucker, Dublin, Calif.

[73] Assignee: Crown Zellerbach Corporation, San Francisco, Calif.

[21] Appl. No.: 541,664

[22] Filed: Jan. 16, 1975

Related U.S. Application Data

[63] Continuation of Ser. No. 327,476, Jan. 29, 1973, abandoned.

[51] Int. Cl.² .................. B29D 23/10; B32B 1/08
[52] U.S. Cl. ...................... 156/466; 53/180 M; 138/151; 138/156; 138/170; 156/555; 156/583
[58] Field of Search .............. 156/202, 203, 204, 218, 156/227, 466, 469, 555, 583; 53/28, 39, 46, 180 R, 180 M, 182; 138/156, 170, 163, 151, 169

[56] References Cited

U.S. PATENT DOCUMENTS

| | | | |
|---|---|---|---|
| 2,385,897 | 10/1945 | Waters | 53/180 M |
| 2,442,936 | 6/1948 | Rohdin | 156/203 |
| 2,897,875 | 8/1959 | Rusch et al. | 156/466 |
| 3,837,972 | 9/1974 | Schuster | 156/466 |

Primary Examiner—William A. Powell
Assistant Examiner—Thomas Bokan
Attorney, Agent, or Firm—Stanley M. Teigland; Corwin R. Horton

[57] ABSTRACT

A conventional fin-type seam formed on tubed bag forming sheet material provided on one face with heat sealable material, has heat sealed overlapping edge portions forming the seam. The fin slides over a back-up plate extending between it and the body of the tube to prevent scuffing of the heat sealable material with consequent seal failure. A tracking wheel engaging the fin presses it against the back-up plate, and maintains alignment.

5 Claims, 5 Drawing Figures

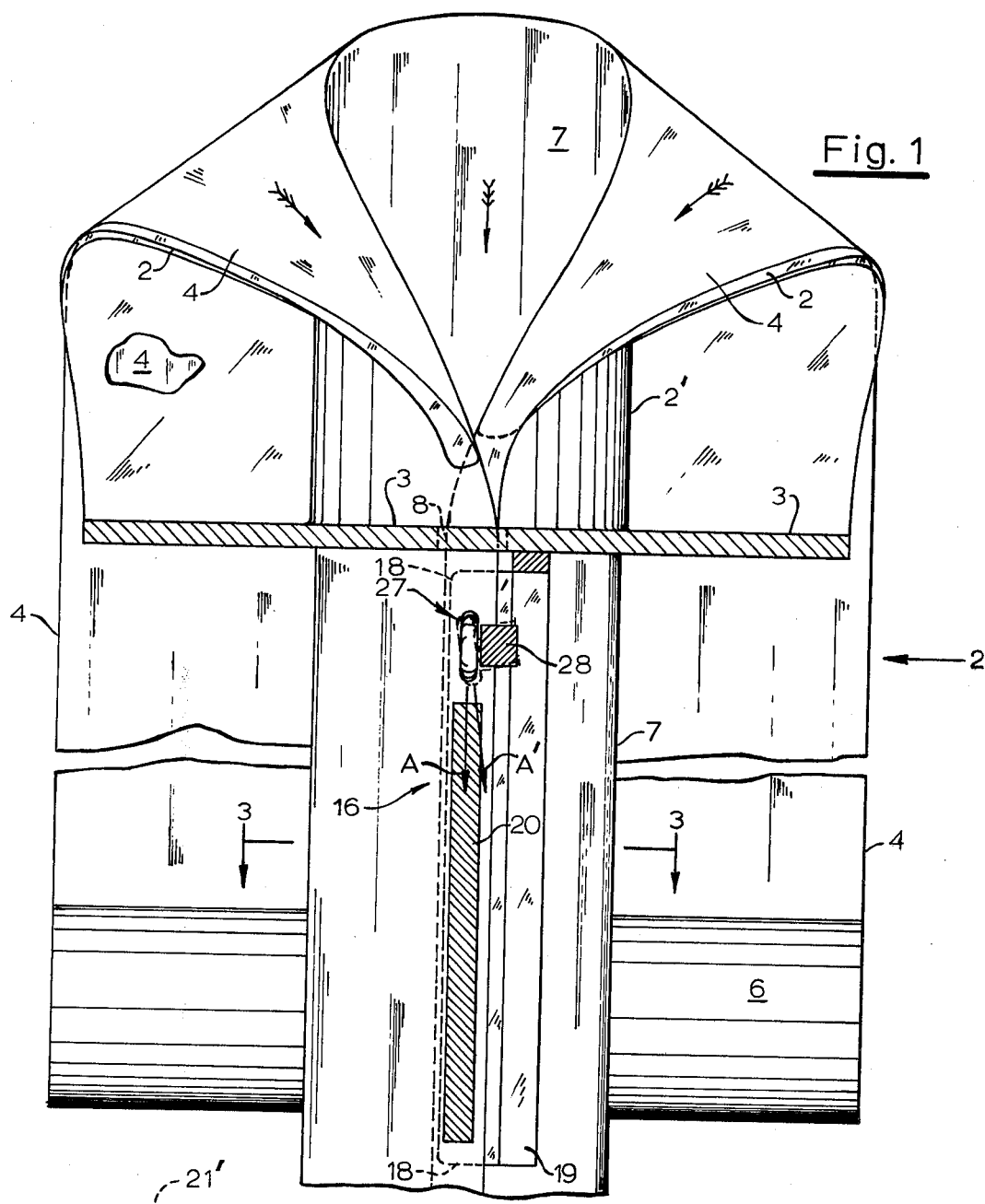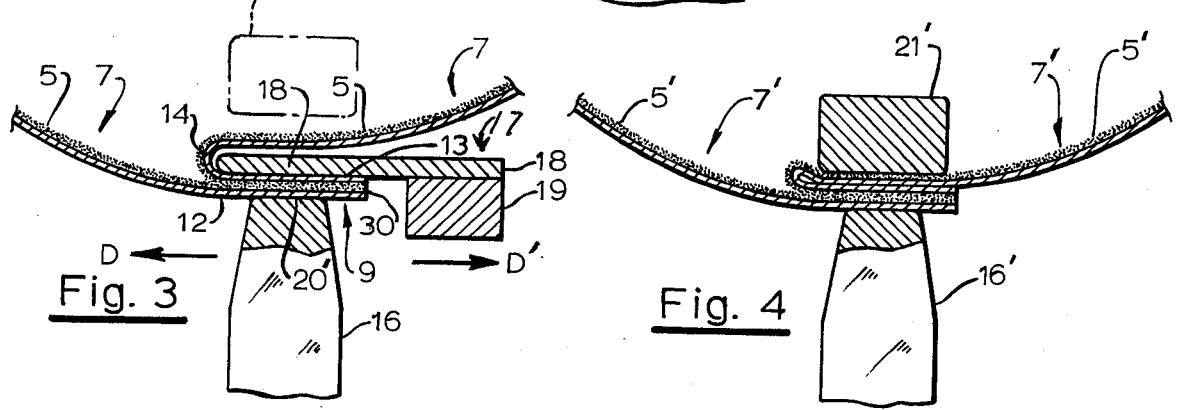

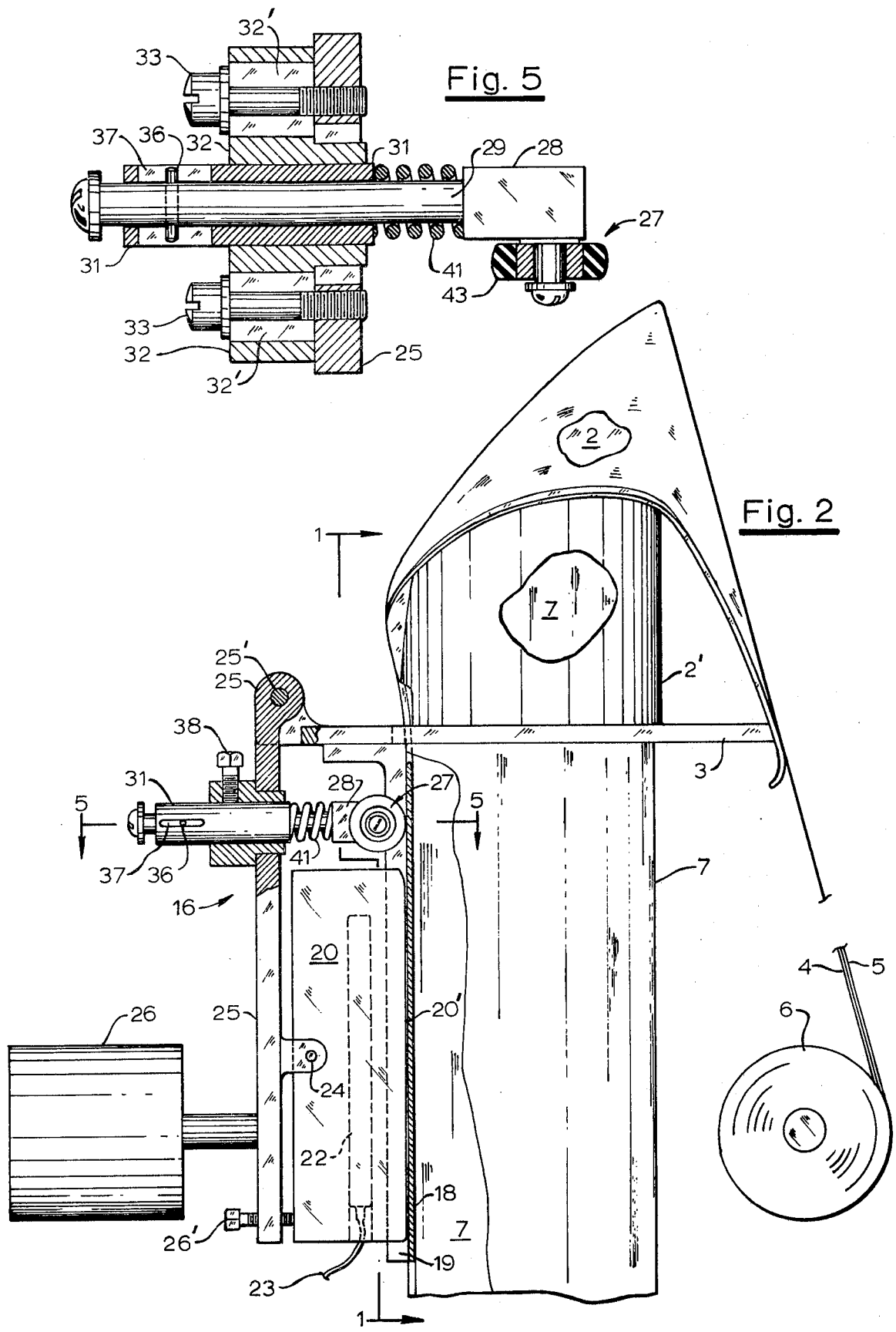

APPARATUS FOR FORMING CONTAINERS WITH FIN-TYPE SEAMS

This application is a continuation of applicant's co-pending application, Ser. No. 327,476, filed Jan. 29, 1973 now abandoned.

BACKGROUND OF THE INVENTION

In conventional bag making wherein a tube is formed from sheet material having a heat sealable material on a face thereof, the tube is continuously moved in an axial direction. A fin-type seal can be formed wherein the inner heat sealable face of one edge portion of the sheet overlaps the inner heat sealable face of the opposite edge portion which is folded back over the body of the tube. A heat sealing die pressing against the fin, heat seals such edges together against a back-up plate heretofore located within the tube.

The heat sealable material is on the inside face of the tube which is the face that necessarily slides over the back-up plate when located within the tube. Heat from a heat sealing die penetrates the fin with the result that the inner heat sealable face of the tube becomes softened and scuffed as it rides over the back-up plate. This frequently results in seal failure and mistracking of the fin over the back-up plate.

SUMMARY AND OBJECTS

Summarizing the invention hereof, it overcomes the foregoing problem by the provision of a back-up plate located outside the tube between the fin and the outer face or body of the tube. As a result, the outer face of the tube body and the outside face of the folded edge portion of the fin, which are not heat sealable faces, can engage the backing plate. Thus, when heat sealing pressure is applied to the fin, the scuffing problem is completely eliminated because faces which do not have the heat sealable material can engage the back-up plate.

There is a tendency for the fin being formed to be pulled or drift in a direction toward the fold line of the fin and away from the outer edge thereof. To overcome such pulling force and maintain tracking alignment of the fin on the back-up plate, a tracking wheel which is rotatable about an axis transverse to the axis of the tube engages the outside of the fin and presses it against the backing plate. This tracking wheel is angularly adjustable about an axis transverse to the axis of rotation of the wheel to counteract the pulling force to the desired extent.

From the preceeding, it is seen that the invention has as its objects, among others, the provision of an improved apparatus and method which will overcome the foregoing scuffing problem, while at the same time, maintain tracking alignment of the fin on the back-up plate, which are simple and economical, and in which the method is easy to perform.

Other objects will become apparent from the following more detailed description and accompanying drawings, in which:

FIG. 1 is a fragmentary front elevation, partly in section of a conventional tube former in conventional bag making apparatus, illustrating the invention hereof; the planes of the section being indicated by line 1—1 in FIG. 2;

FIG. 2 is a side elevation with parts broken away and other parts shown in section to illustrate the construction more clearly;

FIG. 3 is an enlarged horizontal section taken in a plane indicated by line 3—3 in FIG. 1;

FIG. 4 is a similar section, but illustrating the previous type of construction in which a back-up plate is within the tube; and FIG. 5 is a horizontal section taken in a plane indicated by line 5—5 in FIG. 2.

DETAILED DESCRIPTION

As is illustrated in FIGS. 1 through 3, the apparatus comprises a conventional tube forming collar 2 attached to a tube 2' mounted on conventional slotted plate 3 forming part of the frame of the tube forming apparatus. Bag forming sheet material 4 is located on one face 5 (the inside face in the bag tube) with a film of heat sealable resinous material, and is continuously drawn in a conventional manner, from a supply roll 6 (by means in the bag forming apparatus not shown) over collar 2 and through the tube 2' which form bag tube 7 below plate 3. The opposite edges of the sheet 4 are drawn through a slot 8 in plate 3; and a conventional fold-back fin 9, shown best in FIG. 3, is formed. Bags are formed from the tube in a conventional manner in the bag forming machine (not shown).

Parent sheet material 4 is usually of plastic film, such as high density polyethylene, which may vary in thickness from 1.5 mil to 3.5 mil, the face 5 of which is coated with a heat sealable film or coating usually of about 0.2 to 0.3 mil thickness. The coating may be of any suitable resinous heat sealable material, such as an ethyl vinyl acetate. It may also be a heat sealable plastic film bonded to the sheet. However, it is to be understood that the parent sheet may be of any other suitable material having heat sealable material on a face thereof. In the tube forming operation, the heat sealable coating is on the inside face 5 of the bag tube, as is indicated in FIG. 3.

It will be noted from FIG. 3 that the fin-type seam comprises an edge portion 12 of the bag tube, the inner heat sealable face of which overlaps the outer face of opposite edge portion 13 of the tube with the heat sealable faces in engagement; such opposite edge portion 13 being folded back at fold line 14 over the outer face or in other words the body of bag tube 7 adjacent the fin. Heat sealing and consequent bonding of the adhesive coatings of the fin is effected by the usual heat sealing die 16 engaged against edge portion 12 of the fin and pressing it against a back-up means 17, illustrated in FIG. 3, and over which the folded back edge portion 13 continually rides.

Such back-up means comprising an elongated, smooth, and rigid back-up plate 18 located outside the bag tube, between the fin and the outer face of the body of the bag tube, and which is fixedly mounted on a bracket 19 fixedly secured to a frame portion of the apparatus. The inner edge of the back-up plate is rounded. This construction, illustrated in FIG. 3, forms part of the present invention. When the described fin arrangement is first manually formed on back-up plate 18, it will be continuously maintained under the continuous pull of the bag tube through the apparatus and the pressure application effected by die 16.

Previously, as is illustrated in FIG. 4 (in which primed reference numerals are applied to the corresponding elements shown in FIG. 3), the back-up means was a relatively thick bar 21' located inside the bag tube 7' and on which the entire fin-type seam could ride. In other words, there was no back-up plate between the fin and the body of the tube 7'. Because of this, the heat sealable coating 5' on the inside of the bag tube rode over bar 21', adjacent the fold portion 14', under the pressure of heating die 16'. Heat from the die 16' would penetrate the fin, and soften the inside heat sealable coating 5'. Thus, as the tube was continuously moved, scuffing of the softened heat sealable coating would occur as it rode over bar 21'. This often resulted in seal failure and mistracking which are overcome by the construction shown in FIG. 3 wherein the uncoated face of the bag tube at the fin continuously engages back-up plate 18 under the pressure of heating die 16.

Conventionally, heating die 16 comprises a metal block 20 having a cavity containing a heating element 22 connected by wiring 23 to a source of electrical energy (not shown) to heat the block. As can be seen best from FIG. 2, the heat sealing block has an elongated platen face 20', and is pivotally mounted at 24 on a frame 25 which is pivotally mounted at 25' on plate 3 of the apparatus. It is provided with weight means 26 to effect floating engagement of the die platen 20' against the fin-type seam riding over back-up plate 18 hereof. By adjustable screw means 26', the die can be adjusted even with back-up plate 18 about pivot 24. Although a pivotal mounting is disclosed as one embodiment of the floating engagement for the heating die platen 20' against the fin sliding over the back-up plate, other suitable means, such as pneumatic means or spring press means are also conventionally used.

Back-up plate 18 is desirably of rigid relatively nonflexible smooth material fixedly secured to fixed bracket 19, so as to provide a strong bearing surface presenting minimum friction to the fin. It has a minimum thickness to take up as little room as possible; and as can be seen from FIG. 2, it is longer than heat sealing die platen face 20', as it extends from above such face to below the same. The upper end is very close to plate 3 (about 1/32 inch), so there is a continuous support for the fin; and its length is about 8 to 10 inches depending on the size of the apparatus. As an example of a suitable material, it is desirably of clock-spring steel about 0.040 inch thick, resistant to abrasion and wear, and in the range of about 40 to 50 Rockwell hardness. Other suitable material presenting minimum friction, such as chrome-plated steel, may be employed.

As the fin slides over back-up plate 18 between it and the heating die, there is a tendency for it to pull in a direction away from the exposed edge 30 of the fin, toward fold line 14, as is indicated by direction arrow D in FIG. 3. This results in mistracking of the fin on back-up plate 18. Means is provided to overcome this mistracking pull comprising a resiliently pressed and angularly adjustable tracking wheel 27 rotatable about an axis transverse to the bag tube axis. As can be seen from FIGS. 1, 2 and 5, wheel 27 is located upstream of the heating die in the space between the heating die and frame plate 3. It is freely journalled on a bearing 28 fixedly secured to an end of a shaft 29 slidably mounted in a collar or sleeve 31 which is adjustably secured in a bracket 32; the bracket being in turn mounted for lateral adjustment on frame 25 of heating die 16. Bracket 32 has elongated slots 32' through which cap screws 33 extend to permit such lateral adjustment, and which when tight hold the bracket and, consequently, shaft 29, in a selected lateral position.

A pin 36 fixed to shaft 29 and engaging in slots 37 in sleeve 31 permits slidable axial movement of shaft 29 in sleeve 31, but prevents angular movement or rotation of such shaft relative to sleeve 31. Sleeve 31 can be fixed in a selected longitudinal and a selected angularly adjusted position in bracket 32 by clamping means such as set screw 38. A compression spring 41 is interposed between an end of sleeve 31 and bearing 28 on which tracking wheel 27 is journalled.

By the described wheel mounting structure, the position of wheel 27 can be laterally adjusted, through lateral adjustment of bracket 32, to a desired lateral position with reference to back-up plate 18. Also, through clamping means 38, the compression of spring 41 may be adjusted by moving sleeve 31 longitudinally in bracket 32, and then tightening the clamping means; and likewise sleeve 31 and, consequently, shaft 29, can be adjusted angularly in bracket 32 to adjust the angular position (inclination from the vertical) of tracking wheel 27 with reference to the axis of the bag tube. Angular adjustment of the wheel to various positions is indicated in FIG. 1 by the angularly relative arrows A and A'; the arrow A indicating the neutral position of the wheel where it is aligned with the vertical and arrow A' indicating a selected one of angularly adjusted positions at which the wheel can be bodily fixed.

Desirably, wheel 27 has a highly frictional rim for engaging the fin-seal, such as rubber rim 43; and it is desirably of relatively small overall diameter, namely about ⅜ of an inch. The compression of spring 41 is adjusted to be in the order of about 2 to 3 ounces.

It will be noted that tracking wheel 27 is located in the space above heat sealing block 20 close to the upper end of back-up plate 18 and close to tube 2' of the tube former 2, so that it engages the fin portion of the tubed bag right after the bag tube emerges from the tube former. As previously noted, there is a tendancy for the fin-type seam to be pulled or drift toward its fold line 14 in a direction away from the edge 30 thereof. However, by adjusting the angular position of wheel 27 to a selected position at which its upper half is inclined to the left of the vertical, as indicated by the dotted position and the right-hand arrow A' in FIG. 1, the pressure of the wheel on the fin maintains it in engagement with the fin and exerts a pulling force in a direction toward the edge of the fin, indicated by arrow D' in FIG. 3, to compensate for the opposite pulling force and thus effect true tracking. When a run is first started, wheel adjustments can be readily made by the operator until correct tracking is obtained.

The described arrangement can be readily installed as an attachment in an existing apparatus. In such event, the backup means 21' in the apparatus need not be removed, as is indicated by the phantom lines in FIG. 3. However, the arrangement can be incorporated in the apparatus when it is first built.

I claim:

1. In apparatus for forming a continuous tube of bag forming sheet material having a heat sealable inner face of heat sealable material and an outer face free of said heat sealable material and which is continuously moved in an axial direction and while thus moved the heat sealable inner faces along the opposite edges of the sheet are heat sealed into a fin-type seam wherein one edge portion of the sheet is folded back over the body of the tube along a fold line and the opposite edge portion of the sheet overlaps the folded edge portion, and wherein a heat sealing die is provided to heat seal said edge portions together the improvement comprising an elongated, rigidly mounted back-up plate having a smooth back-up surface and an elongated free edge disposed in said axial direction, means for continuously moving and folding said one edge portion of said sheet over said back-up plate with the outer face of said one edge portion engaging said smooth back-up surface of said back-up plate while simultaneously lapping the opposite edge portion of the sheet over said folded edge portion and with said fold line adjacent to the elongated free edge of said back-up plate whereby said back-up plate is located between said folded edge portion and the outside face of the body of the tube, means for pressing said heat sealing die against said overlapped portion while maintaining the outer face of the folded edge portion in sliding engagement with said smooth back-up surface of said back-up plate with the folded edge portion inner face out of engagement with said back-up plate so no scuffing occurs therebetween while the seam is continuously being moved to thus heat seal the seam, a tracking wheel positioned upstream from said heat sealing die in engagement with the outside face of the overlapped edge portion of said seam before the seam is heat sealed to press the seam against the back-up plate and which is mounted for rotation about an axis transverse to the tube axis at a predetermined angular position to apply a pulling force on said seam in a direction toward the edge of the seam and thus oppose drifting of the seam in a direction toward said fold line, and means for maintaining the tracking wheel in such engagement.

2. The apparatus of claim 1 wherein resilient means is provided to urge said tracking wheel into such engagement.

3. The apparatus of claim 2 wherein the tracking wheel is mounted above said heat sealing die.

4. The apparatus of claim 1 wherein the tracking wheel is mounted for angular adjustment about an axis transverse to its axis of rotation.

5. The apparatus of claim 1 wherein the back-up plate is of relatively rigid material fixedly mounted on the frame of the apparatus, the tracking wheel is supported by a shaft slidably but non-rotatably mounted in a sleeve which is angularly adjustable in a frame, adjustable means is provided to maintain the sleeve in a selected adjusted position to thus fix the angular position of the tracking wheel, and a spring is interposed between the sleeve and the tracking wheel to engage the wheel against the seam.

* * * * *